United States Patent [19]
Zorzolo

[11] Patent Number: 4,929,296
[45] Date of Patent: May 29, 1990

[54] MACHINE FOR GLUEING AND FOLDING SHEET-LIKE MATERIALS

[75] Inventor: Luciano Zorzolo, Vigevano, Italy

[73] Assignee: Comelz S.p.A., Vigevano, Italy

[21] Appl. No.: 346,198

[22] Filed: May 2, 1989

[30] Foreign Application Priority Data

May 3, 1988 [IT] Italy ............... 20434 A/88

[51] Int. Cl.$^5$ ............................................. B05C 5/00
[52] U.S. Cl. .................................... 156/357; 12/55; 12/55.1; 156/443
[58] Field of Search .................. 156/356, 357, 443; 12/55, 55.1; 118/683

[56] References Cited

U.S. PATENT DOCUMENTS

| | | | |
|---|---|---|---|
| 3,167,452 | 1/1965 | Lineback | 12/55 X |
| 4,330,354 | 5/1982 | Deubner | 156/356 X |
| 4,557,787 | 12/1985 | Mansfield et al. | 156/356 |
| 4,610,041 | 9/1986 | Yardley et al. | 12/55.1 |
| 4,728,378 | 3/1988 | Bianchi | 156/356 X |

Primary Examiner—David Simmons
Attorney, Agent, or Firm—Guido Modiano; Albert Josif

[57] ABSTRACT

This machine comprises a folding foot co-operating with a fixed abutment and a movable oscillating finger for folding the workpiece border against the folding foot, with a presser for retaining and advancing the workpiece, with a glue feeding device and an adjustable speed actuation motor; the machine also comprises photocells indicating the presence and the shape of the workpiece, a minicomputer for storing and controlling the operative and setting parameters of the machine kinematisms, as can be memorized, in maximum rotation rate at straight, outwardly and inwardly curved portions of the workpiece, advancement pitch at the straight and curved portions, glue dosage, delivery times and temperature, selection of the photocells causing pitch variations and actuation of the cutting blade, and machine operation mode, i.e. manual, automatic and continuous rotation; the machine furthermore has drivers for adjustable control of the operative parameters.

5 Claims, 9 Drawing Sheets

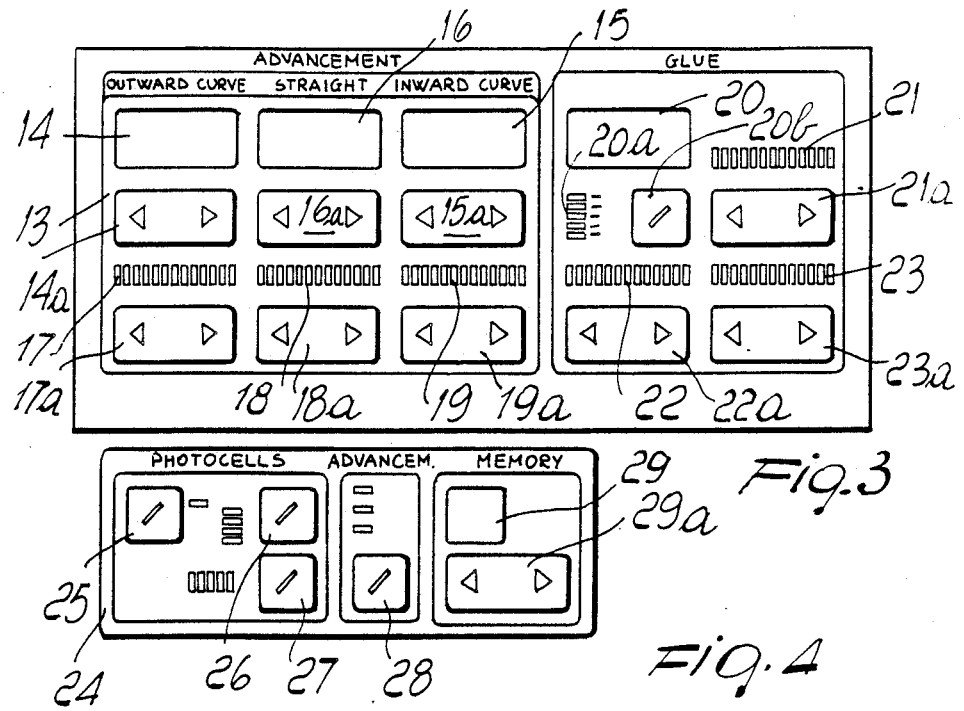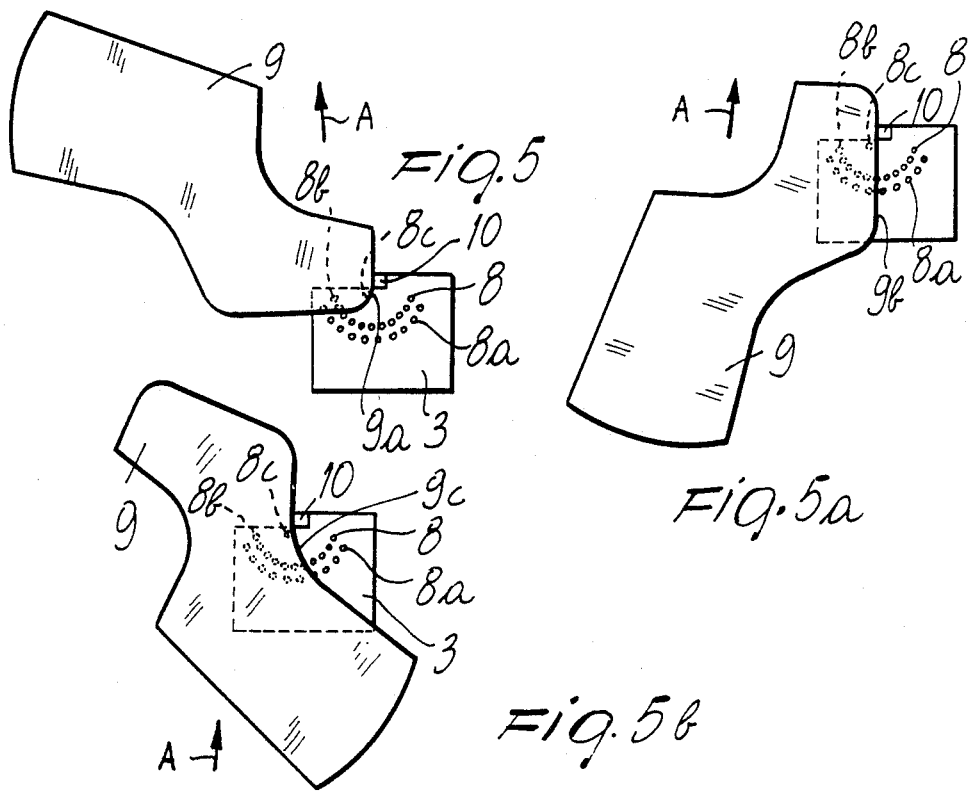

MACHINE FOR GLUEING AND FOLDING SHEET-LIKE MATERIALS

BACKGROUND OF THE INVENTION

The present invention relates to a machine for glueing and folding sheet-like materials. In particular, the invention relates to an automatic machine for folding the edges of workpieces of leather, plastics, fabric and the like, and especially the peripheral edges of shoe uppers.

Various kinds of machines for folding and glueing the edges of shoe uppers, both manually controlled and with partly automatic control, are known.

From a general point of view, a current folding machine comprises a worktable, on which the workpiece to be peripherally hemmed is caused to slide, and an advancement shaft connected to a motor; the speed of said motor is normally adjustable by means of a clutch actuatable by the operator. The advancement shaft actuates various elements for reciprocatingly moving the workpiece according to advancement lengths (the so-called advancement pitch) which are mechanically preset by moving terminal stop elements; the advancement lengths may be changed during treatment by means of an electromagnet or of another kind of actuator in an alternating manner starting from one stop element up to the opposite one. The elements for folding a portion of the peripheral edge of the workpiece comprise a folding foot which co-operates with a fixed abutment and an oscillating finger for folding the edge of the workpiece against the folding foot. Presser means are furthermore provided to retain and advance the folded workpiece. The folding foot is normally axially hollow and the glue is fed through it onto the edge portion to be folded; said glue is fed by means of a geared pump which is actuated mechanically in some cases and by means of direct-current motor or stepmotor servomechanisms in other cases; the glue is dispensed at the lower end of the foot in a preset manner proportionally to the rotation rate of the machine and to the length of the advancement pitch. The machine furthermore comprises a cutting blade which is actuated when the edge to be folded has an inward or concave curvature and cuts the border of the workpiece to facilitate the folding of the inward curves.

The most recent machines furthermore have a system of photocells or light-responsive elements arranged in the worktable so as to recognize the presence and the shape of the workpiece and consequently automatically control, by means of appropriate processor circuits, the beginning and the end of the dispensing of the glue and the reduction of the pitch in the outward curves to be folded; the pre-adjustment of the glue dosage is instead controlled by the operator. The same photocells can cause the actuation of the cutter blade, which can be actuated in combination with the pitch reduction; the pitch is in any case always preset mechanically by the operator.

In folding machines of the above described type the rotation rate of the machine is normally adjusted by the operator, who acts on a clutch, generally included in the main motor, by means of a pedal. Therefore particular care and responsibility by the operator is required, since he must adapt the speed of the machine to the various shapes and dimensions of the workpieces.

If the type of workpiece or the shape and quality of the material of the workpiece are changed, the machine must be adjusted to adapt it to the characteristics of the new workpieces.

This in practice entails an onerous work, besides significant wastes of time and therefore of productivity, since said adjustments must be performed rather frequently during the workday.

The manual adjustment of the various operative parameters of the machine furthermore entails the possibility of errors which cause the production of incorrectly treated workpieces.

SUMMARY OF THE INVENTION

The aim of the present invention is therefore to provide a machine for folding and glueing the edges of planar workpieces of leather, plastics, fabric and the like, and particularly of leather parts for shoe uppers, structured so that substantially all its functional parameters can be preset and memorized on an appropriate electronic computer so that they can be preselected automatically according to the characteristics of the workpieces, with evident advantages as regards the rapidity of the required adjustments, the quality of the treatments and the perfect repeatability of said adjustments.

Not least object of the invention is to provide a machine which is highly reliable in operation, operatively selectable in relation to any kind, shape and size of the workpieces, such as to eliminate guiding errors due to incorrect speed adjustments and also such as to require minimal attention by the operator.

This aim, these objects and others which will become apparent hereinafter from the following description are achieved by a machine for folding and glueing sheet-like materials such as leather parts for shoe uppers, as defined in the appended claims.

BRIEF DESCRIPTION OF THE DRAWINGS

The invention is hereinafter described in detail according to a preferred but not exclusive embodiment, with reference to the accompanying drawings, given only by way of non-limitative example, wherein:

FIG. 3 is a block diagram illustrating a possible panel or screen on which the various parameters for the adjustment of the machine, may be set and displayed;

FIG. 4 is a view of a screen related to the functions performed by the workpiece detection photocells;

FIGS. 5–5a–5b schematically illustrate the variation of the number of light-sensitive cells covered and uncovered by the workpiece, respectively in the case of outward curve, straight portion and inward curve;

DESCRIPTION OF THE PREFERRED EMBODIMENTS

Figure 1:
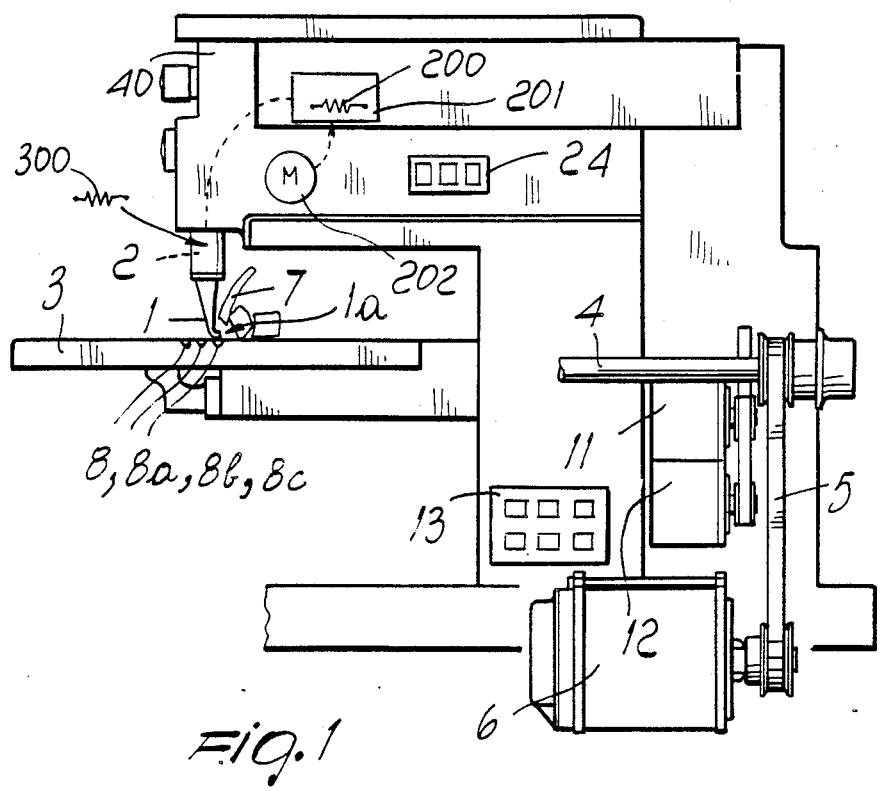
FIGS. 1 and 2 are respectively a side view and a front view of some kinematic details according to the invention and schematically illustrated on a known folding machine.

With reference to said figures, and as can be deduced from what has been described above, the mechanical part of the machine according to the invention is substantially structured like a known machine, i.e. it has an axially hollow folding foot 1 cooperating with a fixed abutment and a movable oscillating finger (not shown)

with glue dispensing nozzle 1a fed through the axial cavity 2 accommodating resistors 300 for controlling the temperature of the glue at the dispensing nozzle 1a; it furthermore has a worktable 3 with photocells 8, 8a, 8b, 8c, a main shaft 4 connected, by means of a belt 5, to a main motor 6 of the direct-current type, with a speed and space feedback loop; to the shaft 4 presser means are provided for retaining and advancing the workpiece. Furthermore in the head 40 of the machine a tank 201 for the glue is provided, said tank having resistors 200 for controlling the glue temperature and a motor 202 or a pump for glue delivering. The remaining folding and glue-dispensing kinematisms are not illustrated as they are beyond the scope of the present invention. Furthermore, the machine according to the invention comprises a pedal 410 arranged below the worktable 3.

According to the present invention, a microprocessor (electronic microcomputer), shown schematically in FIG. 6 and comprised in the control part 400 arranged in a rack below the worktable 3, is associated with this structurally known machine; said microprocessor is of the type with cards or the like which can store a plurality of groups of parameters to be set to perform all the treatments required by the type, shape and dimensions of the workpieces.

Each group of parameters can be displayed by means of a particular numeral, letter or symbol, while any variations in the setting values can be stored by means of a keyboard. The machine is automatically set for the intended treatment by reading one of said numerals or letters.

In particular each group of settings comprises the parameters related to the following settings:

(a) the general temperature of the glue and of the glue-dispensing tip or nozzle;
(b) the pre-setting of the glue dosage;
(c) any delay required for the start of glue dispensing;
(d) the length of the advancement pitch at the outward curves of the workpiece being treated;
(e) the maximum allowed rotation rate of the machine during folding of the edges at outward curves;
(f) the length of the machine's pitch during the treatment of the workpiece straight portions;
(g) the maximum rotation rate of the machine while the straight portions of the workpiece are being treated;
(h) the length of the pitch at the workpiece inward curves;
(i) the maximum rotation rate of the machine at the workpiece inward curves;
(l) possible combined actuation of the cutting blade;
(m) automatic dispensing of the glue upon a signal arriving from photocells or sensor elements associated with the worktable:
(n) manual glue dispensing, which in this case is performed by the operator in a conventional manner;
(o) the photocells controlling the variation of the pitch, force the maximum rotation rate at the outward curves;
(p) the photocells actuating the cutting blade;
(q) the manual start of the machine's rotation, with rotation speed;
(r) automatic start when the workpiece to be treated is so inserted and rotation at the set speed;
(s) start with continuous rotation of the machine at the preset speed.

The above will be further explained hereinafter with reference to FIGS. 7a–7g, explaining how the machine according to the invention allows to set the maximum rotation rate in three different operating conditions, i.e. in the case of straight, inwardly curved and outwardly curved portions, though it still allows the operator to adjust the speed by means of the conventional pedal; in this case the speed can never exceed the set and stored value. According to the invention, the length of the advancement pitches can furthermore be set to the required value, i.e. without having to use a normal pitch which is longer than the curve pitches as occurs in known machines.

The variation of the maximum pre-programmed speed is furthermore automatically controlled by said light-responsive photocells (or sensors).

With particular reference to FIGS. 5–5a–5b, the light-responsive cells 8–8a–8b–8c etc. are arranged on the worktable 3 so as to detect the instantaneous radius of curvature of the workpiece 9 being treated.

Figure 2:
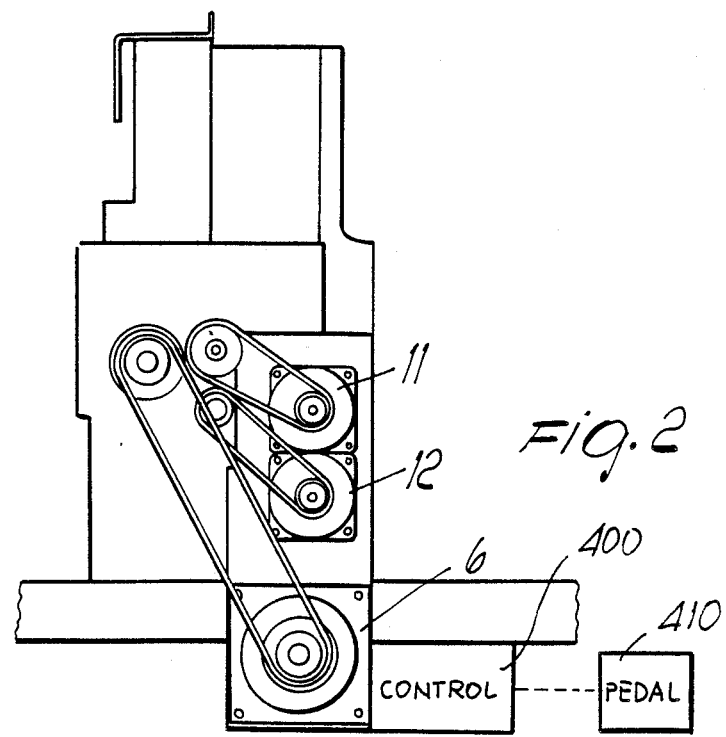

Thus, for example, if the cells are arranged along concentric circles, as in FIGS. 5–5a–5b, with their centers at the folding point 10, the workpiece 9 uncovers or covers the photocells as it is advanced below the foot by the machine according to arrows A and is guided by the operator; said photocells vary the pitch of the machine by means of the step motor 11 (FIG. 2) and cause the actuation of the cutting blade 7 (arranged near the folding foot 1) by means of a similar step motor 12.

Thus in FIG. 5 the cells 8b–8c are covered by the workpiece 9 when said workpiece has an outward curve arriving in the folding region, while the remaining cells are uncovered; covering of the cells 8b–8c (and possibly of others) varies the pitch; in the case of FIG. 5a, the workpiece 9 is to be treated at its straight shape 9b and covers a different number of cells, which thus appropriately adjust the pitch and the maximum rotation rate; similarly, FIG. 5b illustrates a workpiece 9 to be treated at its inwardly curved portion 9c: the related covered cells adjust the pitch and vary it for the entire length of the curve, possibly causing the intervention of the cutting blade simultaneously with the pitch change.

In other words, the required variation of the advancement pitch and the actuation of the main motor 6 in terms of varying the machine's rpm according to the type and radius of the workpiece curves are obtained by means of said step motors (or other space- and time-feedback loop servomotors) by processing the information supplied in the various cases by the photocells, as will be explained.

As regards the possibility of starting the machine, it has already been said that the machine can be started either by the operator by means of the pedal, or automatically, or with a continuous rotation mode; in practice, even during manual operation the operator can use the most appropriate speed according to the dimensions and shape of the workpiece, without having to perform continuous adjustments with the pedal.

The machine can memorize all the parameters deemed most appropriate or most useful, in particular setting of the parameters may be calculated for example as a function of tho radius of tho curves or is based on tables of preset and stored values.

FIG. 3 and 4 are now described, which schematically show how to carry out setting and updating of the values of the parameters pre-selected for the various treatments; said values are visualized on appropriate screens (displays and the like).

Thus in said figures the frame 13 (arranged on the base of the machine, see FIG. 1) is related to the rotation rate, the advancement pitch, glue temperature, glue dispensing delay and glue quantity. In detail, the values of the maximum rotation rates at the outward curve, at the inward curve and at the straight portions are shown, respectively, at displays 14,15 and 16; symbols with the related setting keys 14a, 15a and 16a and indicators of the length of the advancement pitch 17, 18 and 19, with the related setting keys 17a, 18a and 19a, are provided below said keys 14a–16a.

In the same frame 13 a display 20 for the temperature of the glue, indicators 20a with a key 20b for setting glue temperature, indicators 21 with a key 21a for setting nozzle temperature, indicators 22 with a key 22a for setting the glue delivery delay and indicators 23 with a key 23a for glue dosage are provided.

FIG. 4 instead illustrates, inside the frame 24 (arranged at the head 40 of the machine, see FIG. 1), the parameters related to the photocells, i.e. the key 25 for setting automatic or manual start of glue delivery, the key 26 for enabling the blade and the key 27 causing pitch reduction; a switch 28 is furthermore provided in said frame 24 to select between normal, automatic and continuous startup, while a display 29 with a selection key 29a is provided laterally; said screen indicates the selected group of settings.

Figure 6:
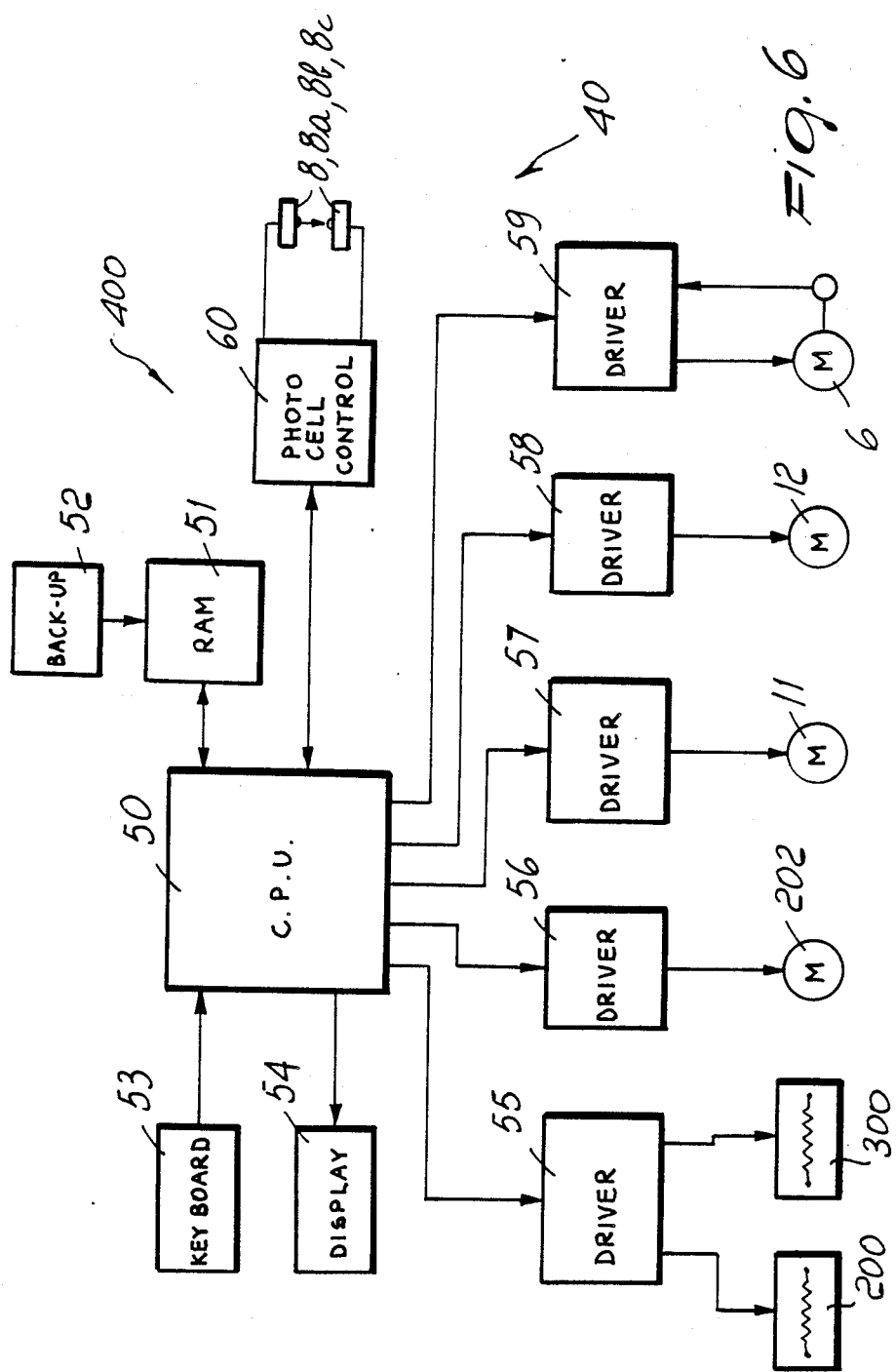
FIG. 6 is a schematic diagram of the control part of the machine according to the invention.

Reference is now made to FIG. 6, illustrating the block diagram of the control part of the machine and its relations with the mechanism shown in FIGS. 1 to 4. As said, the machine is controlled by an electronic control unit, here symbolized by CPU 50, which is connected, in a conventional manner, to a memory (RAM 51 and back-up battery 52). The CPU 50 is further connected to the displays and to the keys shown in FIGS. 3 and 4, and summarized in FIG. 6 by keyboard 53 and display 54. Furthermore the CPU controls a plurality of drivers 55–59, as will be explained hereinafter with reference to FIGS. 7a–7g, for causing actuation of the different mechanisms of the machine. In detail, the machine according to the invention comprises a driver 55 controlling the heating resistors 200 and 300 arranged in the glue tank 201 and in the nozzle 2; a driver 56 controlling the motor 202 for dispensing the glue; a driver 57 controlling the motor 11 adjusting the advancement pitch; a driver 58 controlling the motor 12 actuating the cutter blade 7; and a driver 59 controlling the main motor 6. Furthermore the CPU 50 is connected to a photocell control portion 60, controlling photocells 8, 8a, 8b, 8c.

Figure 7A:
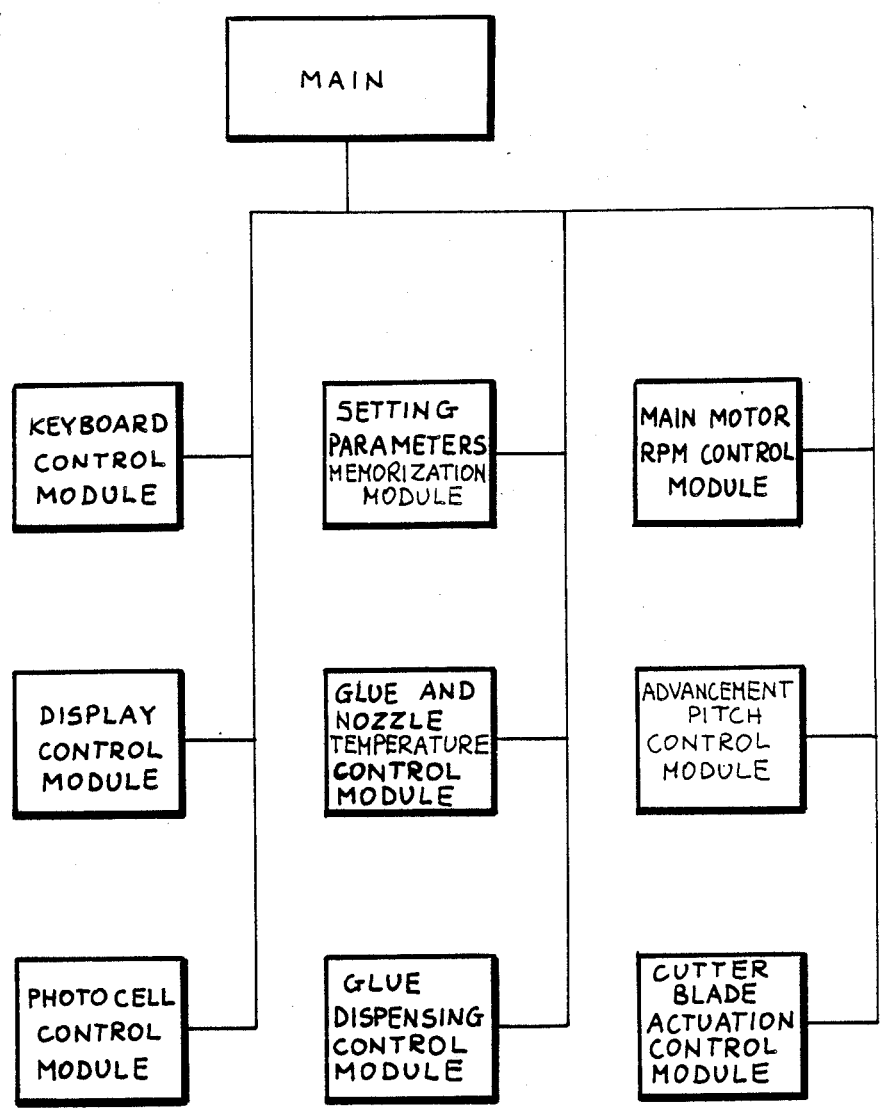
FIGS. 7a–7g are diagrams illustrating the operation of the present machine.
Figure 7B:
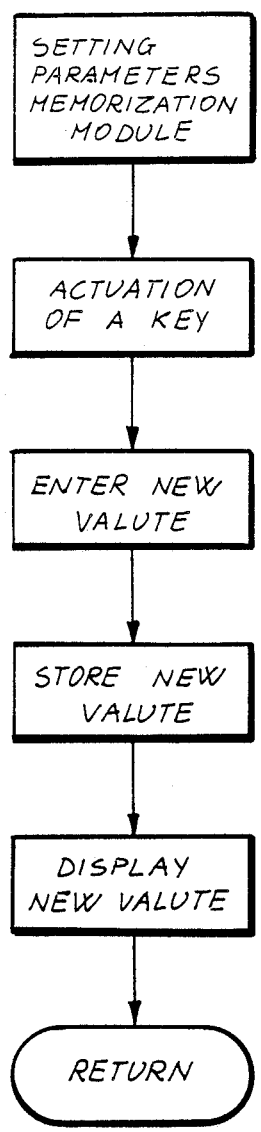
Figure 7C:
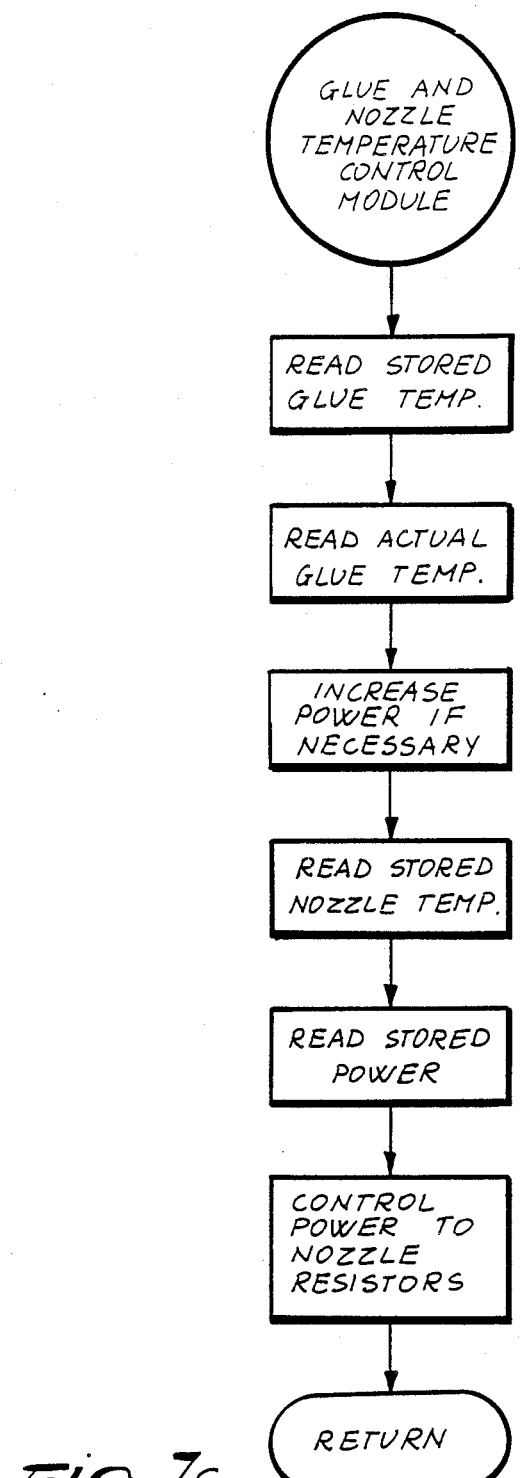
Figure 7D:
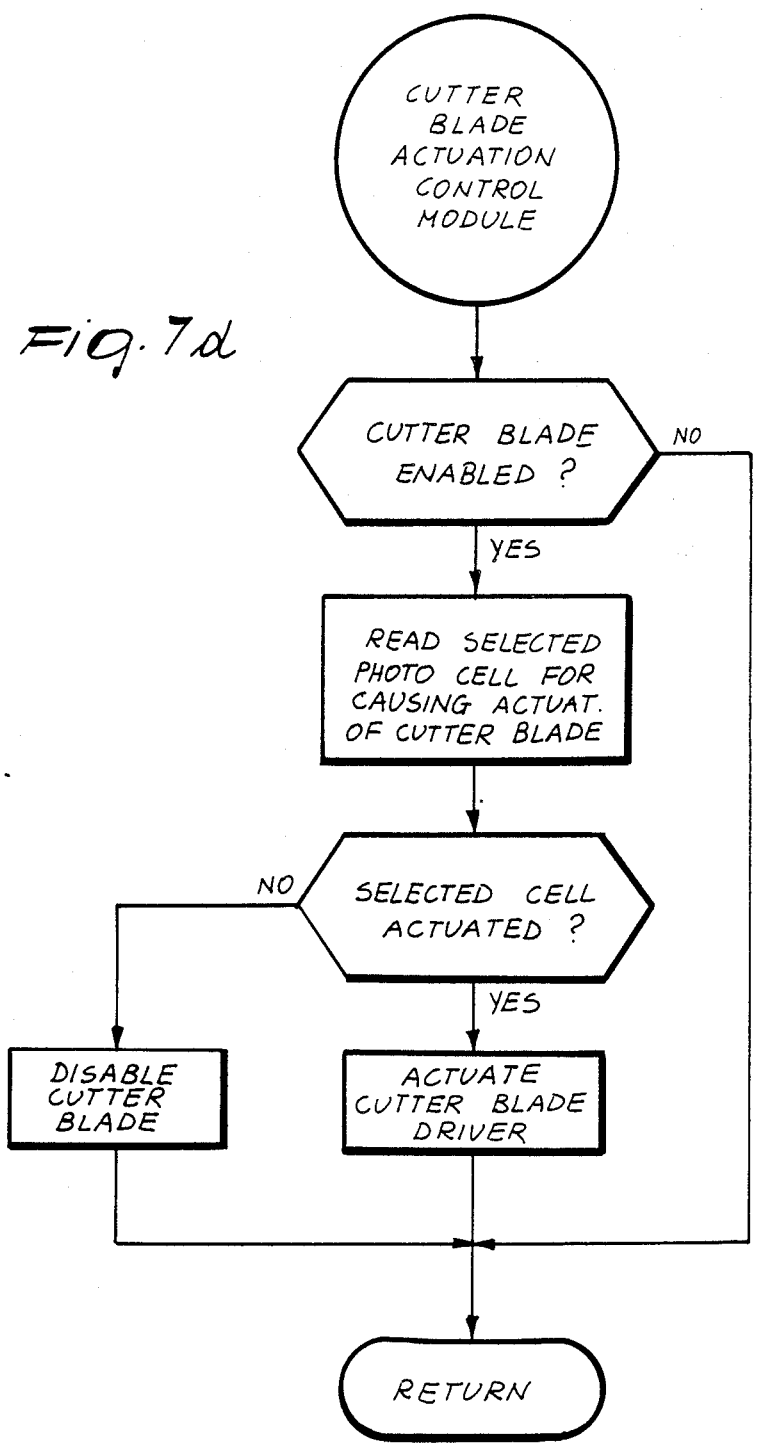

Reference is now made to FIGS. 7a–7g illustrating the operation of the machine according to the present invention. In FIG. 7a the main program is shown, which controls activation of various modules, each controlling a different function of the machine. In particular the main program may operate so as to sequencially give the control to the different modules (polling mode), while an interrupt mode is also possible, according to the operating needs and the requests by the operator. The modules may also call with each other. In detail, the following modules are provided: Keyboard Control Module, which controls actuation of the keyboard, in a per se known manner, allowing interactive operation with the operator; Display Control Module, which controls displaying of the set parameters and of the actual control parameter, also in a per se known manner; Photocell Control Module, controlling operation of the portion 60 so as to conveniently actuate the photocells and to receive the information of which photocells are covered by the workpiece during its advancement. Also this module operates in a conventional manner, and is not described in detail hereinafter. Furthermore a Setting Parameters Memorization Module, which is better shown in FIG. 7b; a Glue And Nozzle Temperature Control Module, as explained with reference to FIG. 7c; a Glue Dispensing Control Module, as explained with reference to FIG. 7g; a Main Motor RPM Control Module, as explained with reference to FIG. 7f; an Advancement Pitch Control Module, as explained with reference to FIG. 7e; and a Cutter Blade Actuation Control Module, as explained with reference to FIG. 7d, are provided.

In FIG. 7b, as said, the Setting Parameters Memorization Module is shown, allowing setting of the parameters already listed. In detail such module controls actuation of a key and enters the set new value of the parameters according to the actuated key. The new value is then memorized with the group of parameters it referes (as displayed by 29 and previously selected through key 29a). Thereby it is possible to memorize different groups of parameters, each for a different type of workpiece. Then, (or possibly before storing) the new set value is displayed, and control is again transferred to the main program.

In the Glue And Nozzle Temperature Control Module (FIG. 7c), which is activated at preset time intervals, the stored glue temperature is read for the workpiece being treated, then actual glue temperature is also read in tank 201 (by means of an apposite thermometer, not shown), and if the difference between set and actual temperature exceeds a selected value, the power to the resistors 200 is increased. Alternatively, the module may only read the set temperature and the corresponding power in an apposite table and correspondingly control the driver 55. Analogously, the temperature of the dispensing nozzle is read (which may be an absolute value or an increment of the glue temperature), the corresponding power to be fed to the resitor 300 is read and the driver 55 is correspondingly fed with this value. Thereafter control is returned to the main program.

In the Cutter Blade Actuation Control Module (FIG. 7d) the machine first controls whether the cutter blade is enabled (preselection through key 26). If no, control is immediately transferred to the main program, otherwise the memory is read to detect which photocell is associated to the actuation of the cutter blade. Then the state of such cell (e.g. cell 8c) is controlled and if such cell is actuated (that is such cell is covered by the advancing workpiece) the cutter blade driver 58 is correspondingly actuated to cause operation of the cutter blade itself, otherwise the cutter blade is maintained in the disabled state, and control is transferred to the main program.

Figure 7E:
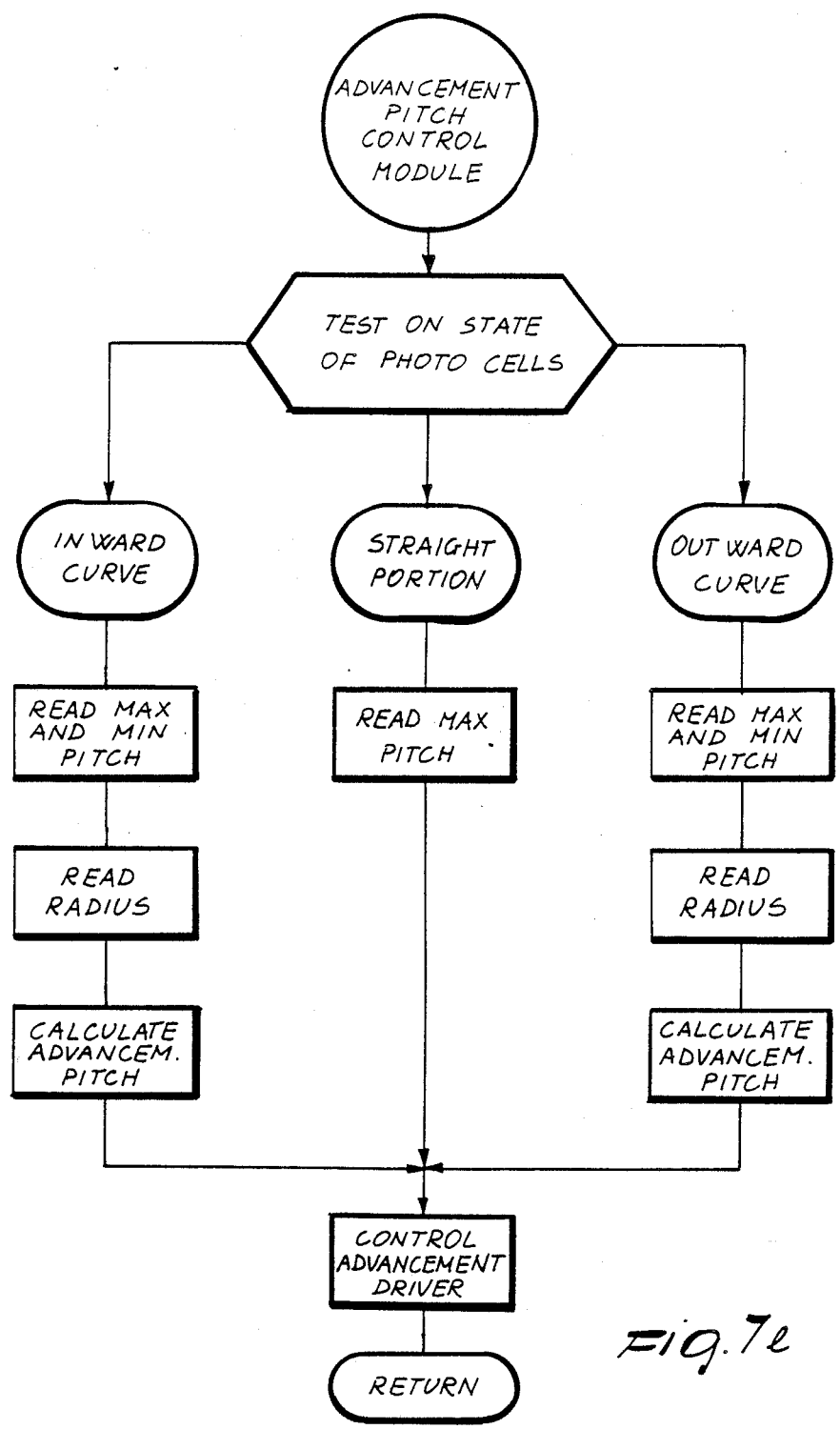
Figure 7F:
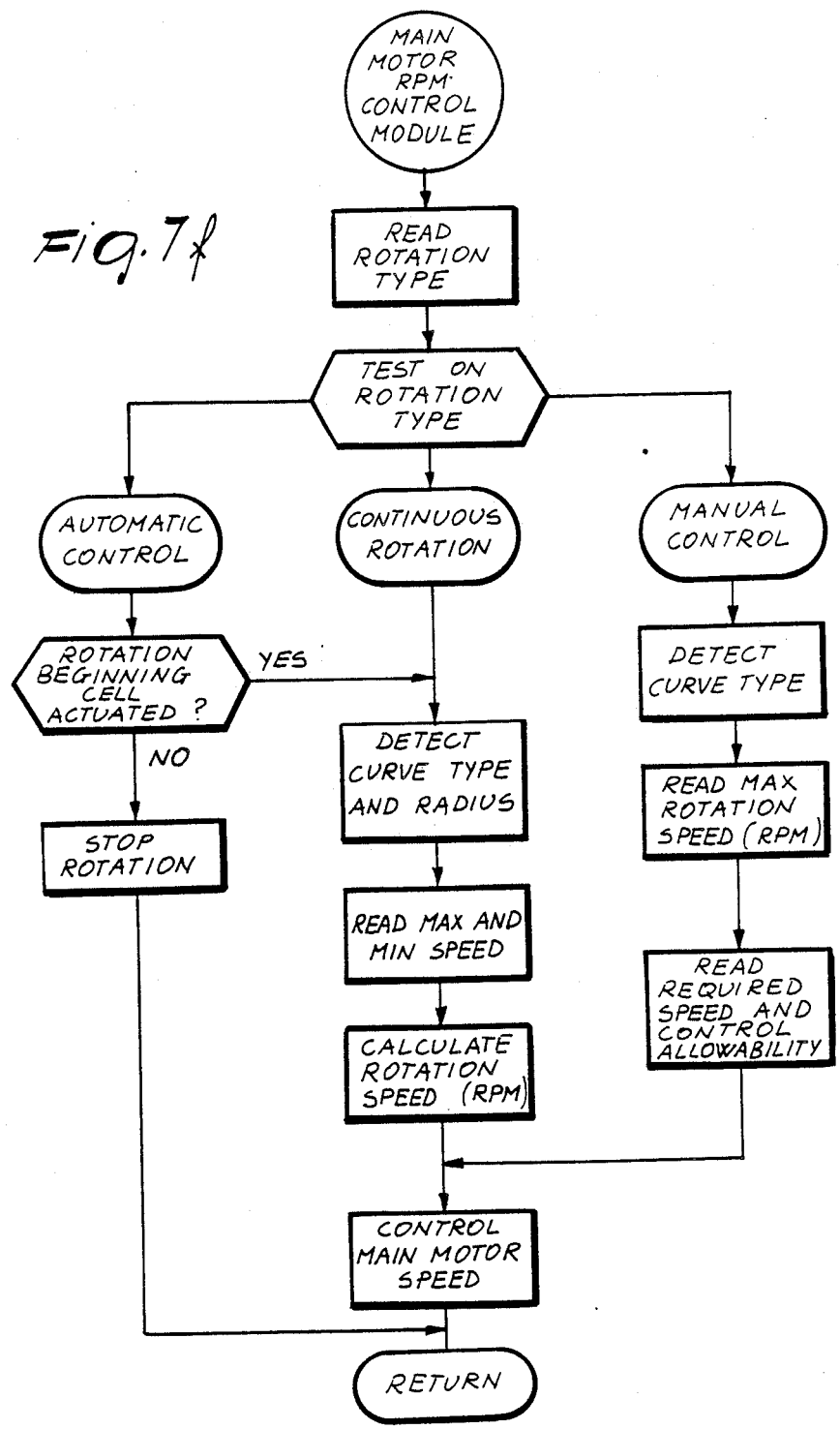

In the Advancement Pitch Control Module (FIG. 7e), first of all the photocells are controlled to establish whether the portion of the workpiece being treated is straight, outwardly or inwardly curved, and control is transferred to a different branch of the scheme of FIG. 7e, according to the result of this test. Such test is effected by controlling which photocells are covered by the workpiece, as already detailingly explained with reference to FIGS. 5, 5a and 5b. In the case of straight portion, the value of the corresponding maximum pitch (as selected through key 18a) is read from the memory and the advancement driver 57 is accordingly controlled. In the case of inward curve, the maximum and the minimum pitches (as selected through key 19a) are read, the radius of the curve is calculated (e.g. through a table, giving the radius as a function of the number of uncovered cell or by actually calculating it, always according to the number of uncovered photocells, by simply multiplying the number of uncovered cell to a unitary radius) and then the optimal advancement pitch is correspondingly calculated (e.g. again by means of a table). Then the driver is accordingly actuated. In the case of outward curve, the procedure is similar to the case of inward curve, while the value are generally different, and the number of covered cell is detected. Thereafter control is again transferred to the main program.

In the Main Motor RPM Control Module (FIG. 7f) initially the rotation type (as selected through key 28) is read from the memory. According on which type of rotation has been selected, control is transferred to a different branch of this flow-chart. In the case of automatic control, firstly the photocell controlling beginning of the rotation (as determined in a previous step, already described) is tested. If such photocell is not actuated (that is such cell is not covered) rotation is not enabled, respectively is stopped. Otherwise (as in the case of continuous rotation) the curve type and radius are determined, as above explained. Then maximum and minimum speed for the detected curve type are read, and the rotation speed (RPM) is accordingly calculated (e.g. through a table). Then the main motor is accordingly driven through driver 59. When instead manual control is selected, the curve type is again detected through the photocells, and the set maximum speed for this curve type is read in the memory. Thereafter the speed required by the operator through the pedal 410 during operation of the machine is also read. Then the machine controls that the required speed does not exceed the preset maximum value and controls the main motor speed accordingly. Then the program control is again transferred to the main program.

Figure 7G:
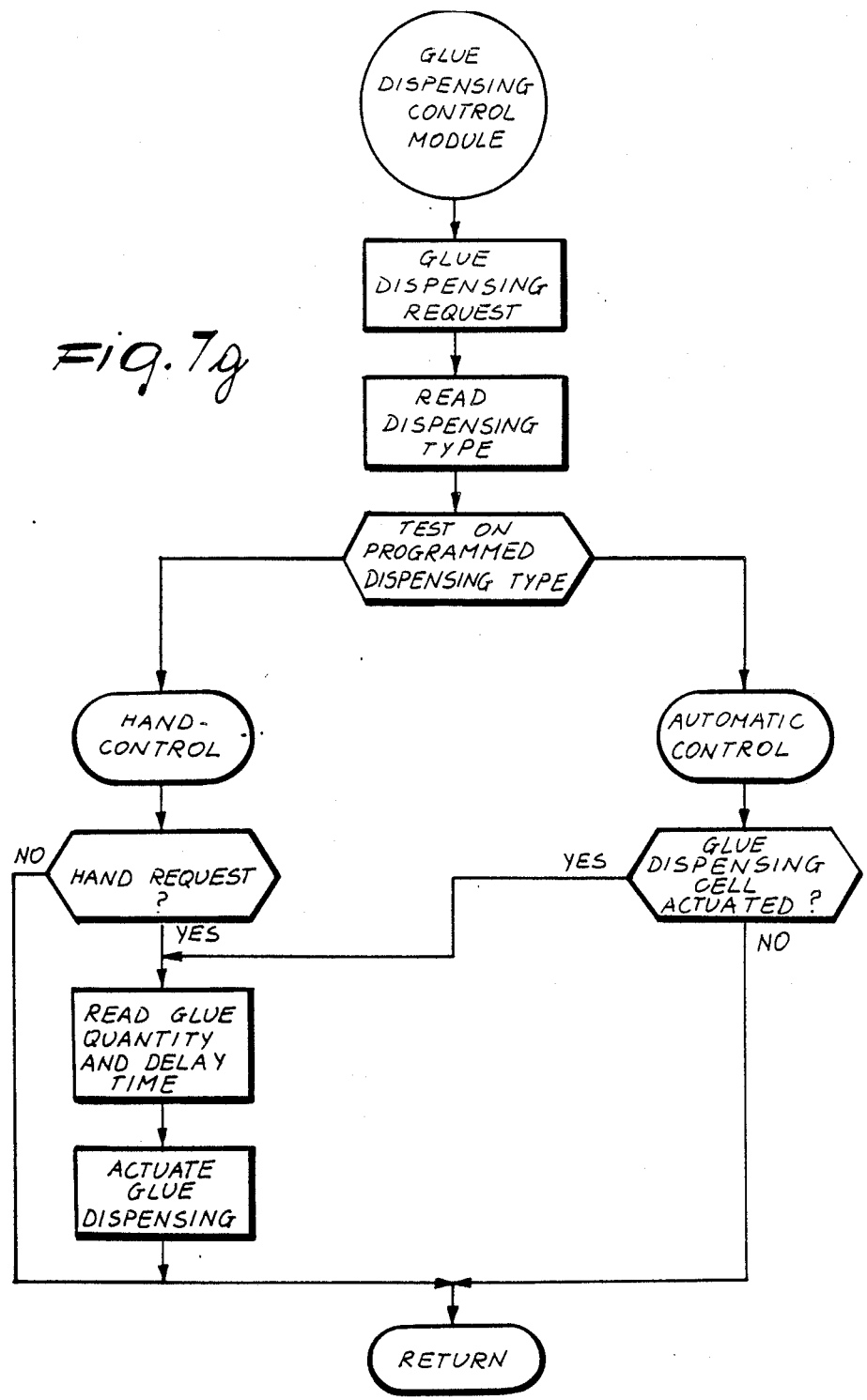

In FIG. 7g the Glue Dispensing Control Module is shown. This module is activated when a glue dispensing request is detected, which request may be a manual one or an automatic one. When such module is activated, it reads in the memory the set glue dispensing control mode. If a manual control mode is selected, the CPU verifies whether the received request has been actually made by the operator (through key). If this is the case, the glue quantity and possibly the glue dispensing delay time (as set through keys 22a, 23a) are read and the driver 56 is accordingly controlled. Otherwise no glue is dispensed. If on the contrary automatic control has been preselected, the cell which enables glue dispensing is detected for establishing if this cell is covered or not. If not, no glue is dispensed, if yes the glue dispensing parameters are read and the driver is accordingly controlled. The control is again transferred to the main program.

The invention as described above is naturally susceptible to structurally and functionally equivalent modifications and variations without thereby abandoning the scope of the protection of the present invention.

I claim:

1. A machine for folding and glueing edges of sheet-like workpieces, such as leather parts of shoe uppers, comprising a worktable, a foot for folding an edge of a workpiece, a cutting blade for cutting inwardly curved portions, means for advancing the workpiece, a glue dosage and delivery device, a main motor, photo-reponsive means for detecting presence and shape of the workpiece, and kinematic elements arranged between said main motor and said foot, blade and advancing means, comprising at least one electronic control unit, for memorizing groups of machine setting parameters related to a plurality of workpieces of various types and dimensions, so as to automatically select settings suitable for the instant workpiece, and a plurality of drivers for transmitting said settings to said kinematc elements, the memorization comprising at least the following setting parameters:

preset dosage of glue quantity, glue temperature and temperature of the glue delivery device;
delay time for starting glue dispensing;
advancement pitch of the machine during treatment of outwardly curved regions of the workpiece;
maximum rotation rate of the machine during treatment of the outwardly curved regions of the workpiece;
advancement pitch during the treatment of straight portions of the workpiece;
machine maximum rotation rate during treatment of the straight portions of the workpiece;
advancement pitch during the treatment of the inwardly curved regions of the workpiece;
maximum rotation rate of the machine during treatment of inwardly curved portions of the workpiece;
possible actuation of the cutting blade;
manual and automatic actuation of the glue delivery device;
selection of the light-reponsive means intended to detect the shape of the workpiece and to cause change in the pitch and rotation rate;
selection of the light-reponsive means causing actuation of the cutting blade;
operation mode of the machine selected between manual mode or automatical mode with startup when workpiece is inserted at set speed, or continuous mode at set speed: displays for displaying the selected parameters for each workpiece and means for setting desired parameter values being furthermore provided.

2. A machine according to claim 1, wherein the information supplied by said light-reponsive means is processed by said electronic control unit and sent to drivers for setting the pitch at the straight regions, varying the advancement pitch at said curved regions and adjusting the rotation rate of the main motor according to type, dimensions and radius of curvature of the curved regions.

3. A machine according to claim 1, wherein at least one keyboard is associated with said electronic control unit for memorizing the setting parameters.

4. A machine according to claim 1, wherein settable maximum and minimum pitch and maximum speed are memorized in a memory of the electronic control unit.

5. A machine according to claim 1, wherein said electronic control unit comprises means for controlling said displays, means for controlling said parameter setting means, means for controlling said photo-reponsive means, means for storing setting parameters, means for controlling glue and nozzle temperature, means for controlling glue delivery, means for controlling the main motor rotation rate, means for controlling the advancing pitch and means for controlling the cutter blade actuation.

* * * * *